(12) United States Patent
Silva

(10) Patent No.: US 12,141,017 B2
(45) Date of Patent: Nov. 12, 2024

(54) SYSTEMS AND METHODS FOR COORDINATING POWER DELIVERY IN A MODULAR MULTI-PHASE POWER DELIVERY SYSTEM

(71) Applicant: AcLeap Power Inc., Taipei (TW)

(72) Inventor: Arturo Silva, Allen, TX (US)

(73) Assignee: AcLeap Power Inc., Taipei (TW)

( * ) Notice: Subject to any disclaimer, the term of this patent is extended or adjusted under 35 U.S.C. 154(b) by 116 days.

(21) Appl. No.: 17/899,745

(22) Filed: Aug. 31, 2022

(65) Prior Publication Data

US 2024/0069622 A1    Feb. 29, 2024

(51) Int. Cl.
*G06F 1/3296* (2019.01)
*G06F 1/3206* (2019.01)

(52) U.S. Cl.
CPC .......... *G06F 1/3296* (2013.01); *G06F 1/3206* (2013.01)

(58) Field of Classification Search
CPC .... G06F 1/3296; G06F 1/3206; G06F 1/3203; G06F 1/26
See application file for complete search history.

(56) References Cited

U.S. PATENT DOCUMENTS

| | | | |
|---|---|---|---|
| 9,977,488 B1 * | 5/2018 | Kong | G06F 1/3287 |
| 11,135,940 B2 | 5/2021 | Quattrini | |
| 2013/0278234 A1 * | 10/2013 | Krellner | H02M 3/1584 |
| | | | 323/282 |
| 2014/0035628 A1 * | 2/2014 | Oaklander | H02M 3/156 |
| | | | 327/109 |
| 2016/0181803 A1 * | 6/2016 | Krishnamurthy | G06F 1/3296 |
| | | | 307/31 |
| 2018/0134166 A1 | 5/2018 | Li et al. | |
| 2018/0364784 A1 * | 12/2018 | Luo | G05B 15/02 |
| 2020/0039374 A1 | 2/2020 | Strasser | |
| 2022/0212551 A1 | 7/2022 | Bouman | |
| 2022/0399815 A1 * | 12/2022 | Cheung | H02M 1/0025 |
| 2023/0367376 A1 * | 11/2023 | Yoshimoto | G01K 3/005 |

FOREIGN PATENT DOCUMENTS

DE      102020213788 A1     5/2022

OTHER PUBLICATIONS

European Search Report for corresponding European App. No. 23194399.4, mailed Apr. 4, 2024, 7 pages.

* cited by examiner

*Primary Examiner* — Raymond N Phan
(74) *Attorney, Agent, or Firm* — McCarter & English, LLP

(57) ABSTRACT

A multi-phase modular power delivery system, comprising a master module integrated with a main circuit board. A controller installed on the master module, the controller configured to receive an input voltage from the main circuit board and provide a variety of voltage levels to the master module for internal power and internal operation based on the received input voltage, provide power to a first load connected to the main circuit board using a first smart power stage installed on the master module, and provide power to a second load connected to the main circuit board using a second smart power stage, wherein the second smart power stage is installed on a satellite module.

20 Claims, 7 Drawing Sheets

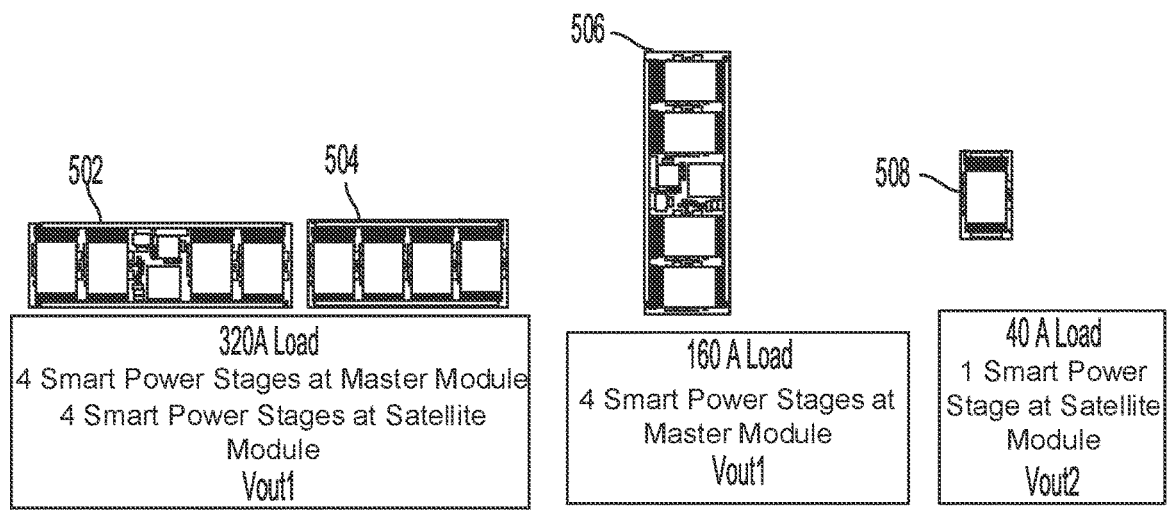
FIG. 5A
FIG. 5B
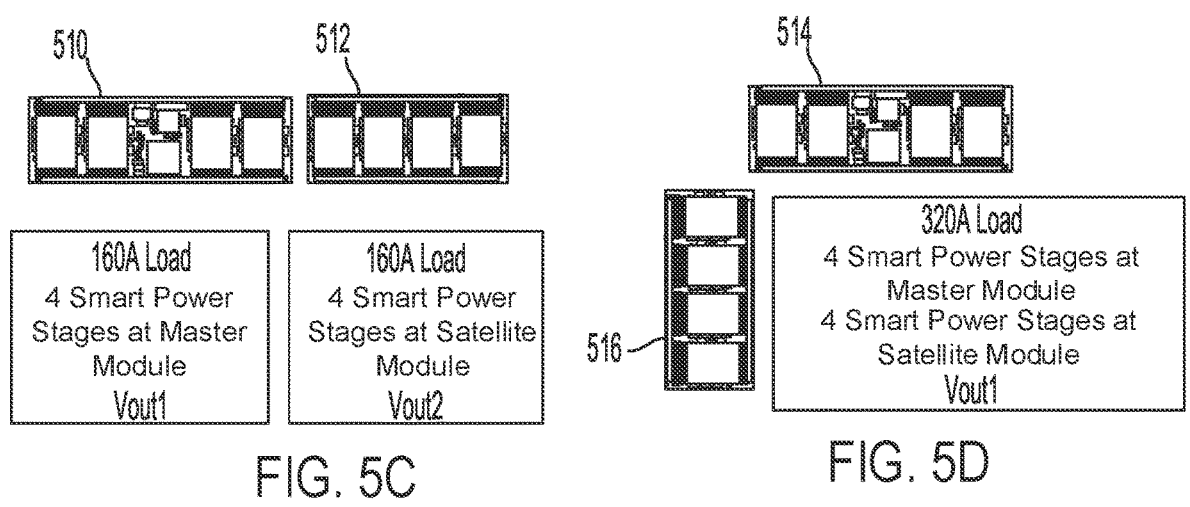
FIG. 5C
FIG. 5D

SYSTEMS AND METHODS FOR COORDINATING POWER DELIVERY IN A MODULAR MULTI-PHASE POWER DELIVERY SYSTEM

BACKGROUND

Different components installed on a main circuit board (MCB), such as central processing units (CPUs), graphics processing units (GPUs), Field Programmable Gate Arrays (FPGAs), and other application specific integrated circuits (ASICs), have vastly different power needs. For example, these different components of the MCB may require different input current and voltage values for optimal function.

Conventional methods of meeting the varied power requirements of the different MCB components include using different None isolated power convertors that regulate the voltage in the MCB for each component or load individually. However, adding a power convertor for each of the respective components on the MCB is expensive, and occupies space on the MCB, thereby reducing the power density of the MCB. Furthermore, none isolated power convertor may only provide one level of power curated for one particular component on the MCB. The isolated power convertors are not designed to increase or decrease their power capacity as needed. This reduces the functional efficiency of the MCB. As electronic components on the MCB become smaller, there is a need for a modular product that is able to supply a spectrum of power to a variety of products without drastically reducing the power density of the MCB.

SUMMARY

A first aspect of the present disclosure provides a multi-phase modular power delivery system. The system comprises: a master module integrated with a main circuit board; a controller installed on the master module, the controller configured to: receive an input voltage from the main circuit board; provide a variety of voltage levels to the master module for internal power and internal operation based on the received input voltage; provide power to a first load connected to the main circuit board using a first smart power stage installed on the master module; and provide power to a second load connected to the main circuit board using a second smart power stage, wherein the second smart power stage is installed on a satellite module.

According to an implementation of the first aspect, the satellite module is remote with respect to the master module.

According to an implementation of the first aspect, the master module includes three additional smart power stages in addition to the first smart power stage installed on the master module.

According to an implementation of the first aspect, the satellite module includes three additional smart power stages in addition to the second smart power stage installed on the satellite module.

According to an implementation of the first aspect, the controller on the master module is further configured to provide the satellite module with bias voltage and power.

According to an implementation of the first aspect, controller on the master module is further configured to control the satellite module by exchanging a plurality of signals between the master module and the satellite module.

According to an implementation of the first aspect, the plurality of signals exchanged between the master module and the satellite module comprise a temperature signal and a current signal.

A second aspect of the present disclosure provides a method for executing a transfer from a first power source to a second power source. The method comprises receiving an input voltage from the main circuit board; providing a variety of voltage levels to the master module for internal power and internal operation based on the received input voltage; providing power to a first load connected to the main circuit board using a first smart power stage installed on the master module; and providing power to a second load connected to the main circuit board using a second smart power stage, wherein the second smart power stage is installed on a satellite module.

A third aspect of the present disclosure provides a non-transitory computer-readable medium having processor-executable instructions stored thereon, wherein the processor-executable instructions, when executed by one or more processors, facilitate: receiving an input voltage from the main circuit board; providing a variety of voltage levels to the master module for internal power and internal operation based on the received input voltage; providing power to a first load connected to the main circuit board using a first smart power stage installed on the master module; and providing power to a second load connected to the main circuit board using a second smart power stage, wherein the second smart power stage is installed on a satellite module.

BRIEF DESCRIPTION OF THE DRAWINGS

Embodiments of the present disclosure will be described in even greater detail below based on the exemplary figures. The present disclosure is not limited to the exemplary embodiments. All features described and/or illustrated herein can be used alone or combined in different combinations in embodiments of the present disclosure. The features and advantages of various embodiments of the present disclosure will become apparent by reading the following detailed description with reference to the attached drawings which illustrate the following:

FIGS. 3-4 and 5A-5D are simplified block diagrams depicting various configurations of the exemplary power delivery stage, in accordance with one or more examples of the present application.

DETAILED DESCRIPTION

Systems, methods, and computer program products are herein disclosed to provide a versatile modular multi-phase power delivery system that is capable of providing power to two different loads on an MCB based on the different respective power requirements of each load. Different components installed on a main circuit board, such as central processing units (CPU), graphics processing unit (GPU), Field Programmable Gate Arrays (FPGA), and other application specific integrated circuits (ASIC), have vastly different power needs. For example, these different components of the MCB may have different input current and voltage requirements to function smoothly.

The present invention relates to a power delivery system that is a high current, high power system with single or dual outputs. The power delivery system is designed and configured to distribute power in a high density circuit board to feed a single component or two different components. In some examples, a component of the MCB, such as a CPU, GPU, FPGA, or ASIC may also be referred to as a load for the purposes of this application.

Figure 1:
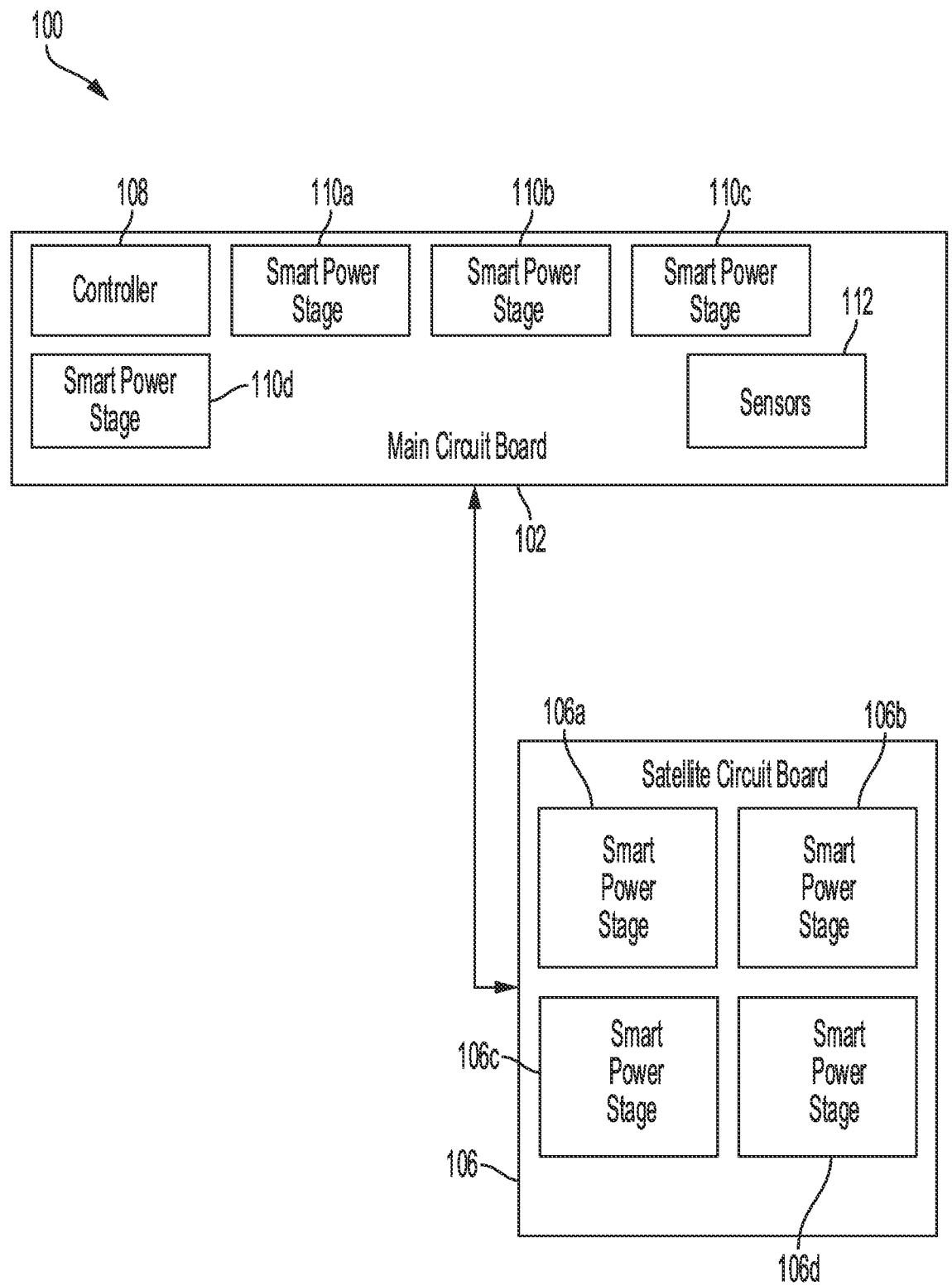
FIG. 1 is a simplified block diagram depicting an exemplary environment of a power delivery stage, in accordance with one or more examples of the present application.

FIG. 1 is a simplified block diagram depicting an exemplary environment of a power delivery system 100, in accordance with one or more examples of the present application. In some embodiments, the power delivery system 100 comprises a master module 102 that maintains digital control of the power delivery system via controller 108 present on the master module 102. In some examples, controller 108 is responsible for the operation of the master module 102 and satellite module 106. In such examples, controller 108 receives an input voltage from the main circuit board that powers the controller 108 for operation. Controller 108 then extracts a variety of voltage levels from the input voltage received from the main circuit board for internal power and internal operation of the master module 102. For example, the received input voltage is used to power the various sensors 112 of the master module 102. The received input voltage is also used to provide power and a bias voltage to satellite module 106. Controller 108 of the master module receives operational information from sensors 112. In addition to the controller 108 and sensors 112, the master module 102 includes smart power stages that provide power to a load on the main circuit board, per the specifications of the load and the main circuit board. In some cases, the master module may be capable of having up to four (4) smart power stages installed on the master module in addition to the controller 108 and sensors 112. The four smart power stages 110a, 110b, 110c, and 110d are configured to provide power to a load connected to the master module. In some examples, each smart power stage on the master module may have a maximum current rating like 10 A, 20 A, 30 A, or 40 A, for example. For the purposes of describing this invention, we will use 40 A as the maximum current rating of a smart power stage, though it should be clear to one of skill in the art that the master module may be configured to work with smart power stages that provide any amount of maximum current.

In some embodiments, the number of smart power stages that are installed on the master module are decided based on a power need of the component or load to which the master module is connected. A maximum of four smart power stages may be installed in conjunction with the master module. Thus, if one smart power stage is capable of providing a maximum current of 40 A, two smart power stages are capable of providing a maximum current of 80 A, three smart power stages are capable of providing a maximum current of 120 A, and four smart power stages are capable of providing a maximum current of 160 A. In some embodiments, the number of smart power stages to be installed in conjunction with the master module are determined based on requirements of the load element of the main circuit board to which the power delivery system is configured to provide power. For example, in the above scenario, if there is a load that has a current rating of 30 A on the MCB, then the power delivery system 100 may be configured to have a single smart power stage in conjunction with the master module 102 as the single smart power stage has a maximum power rating of 40 A. Similarly, for a product that requires 90 A of current, the master module may be configured with 3 smart power stages installed in conjunction with the controller 108 and sensors 112 to meet the power requirements of the load.

In some cases, the master module may be configured to provide power to a first load on the MCB, that has a requirement of 30 A. In such embodiments, the power delivery system 100 may be configured to have a single smart power stage in conjunction with the master module 102 as the single smart power stage has a maximum power rating of 40 A. In such embodiments, the master module 102 may be reconfigured to provide power to a different load that has a requirement of 50 A instead of the 30 A of the first load. In such embodiments, the deficit power capacity of the master module 102 with one smart power stage may be addressed by adding a second smart power stage to the master module 102 to increase the power delivering capacity of the master module from 40 A to 80 A.

In addition to the master module, the power delivery system 100 also includes a satellite module 106. In some examples, the satellite module 106 may be configured to provide power to the same load as the master module 102. The number of smart power stages installed on the satellite module 106 is determined based on the power requirement of the singular load to which both the master module 102 and satellite module 106 provide power.

In some embodiments, the master module 102 and the satellite module 106 may be configured to provide power to two different loads. In such embodiments, the number of smart power stages installed on the master module 102 and the satellite module 106 will depend on the power requirements of each of the two different loads. For example, a first load of the MCB, connected to the master module 102 may have a power requirement of 30 A and a second load of the MCB may have a power requirement of 90 A. In such examples, the master module may be configured to include one smart power stages 110a and the satellite module may be configured to include three smart power stages 106a, 106b, and 106c.

In some cases, the master module 102 and the satellite module 106 may be configured to provide power to one loads. In such embodiments, the number of smart power stages installed on the master module 102 and the satellite module 106 will depend on the power requirements of the one load. For example, the load of the MCB, connected to the master module 102 may have a power requirement of 90 A. In such examples, the number of smart power stages on the master module 102 and the satellite module 106 may be configured may be configured to include three smart power stages. These three smart power stages may be distributed between the master module 102 and satellite module 106.

In some embodiments, satellite module 106 may be configured to have a maximum of four smart power stages 106a, 106b, 106c, and 106d.

In some examples, the smart power stages 106a-d installed on the satellite module 106 communicate with the controller 108 by providing signals to sensors 108. The controller 108 is configured to control the smart power stages 110a-d of the master module 102 and smart power stages 106a-d of satellite module 106.

Figure 2:
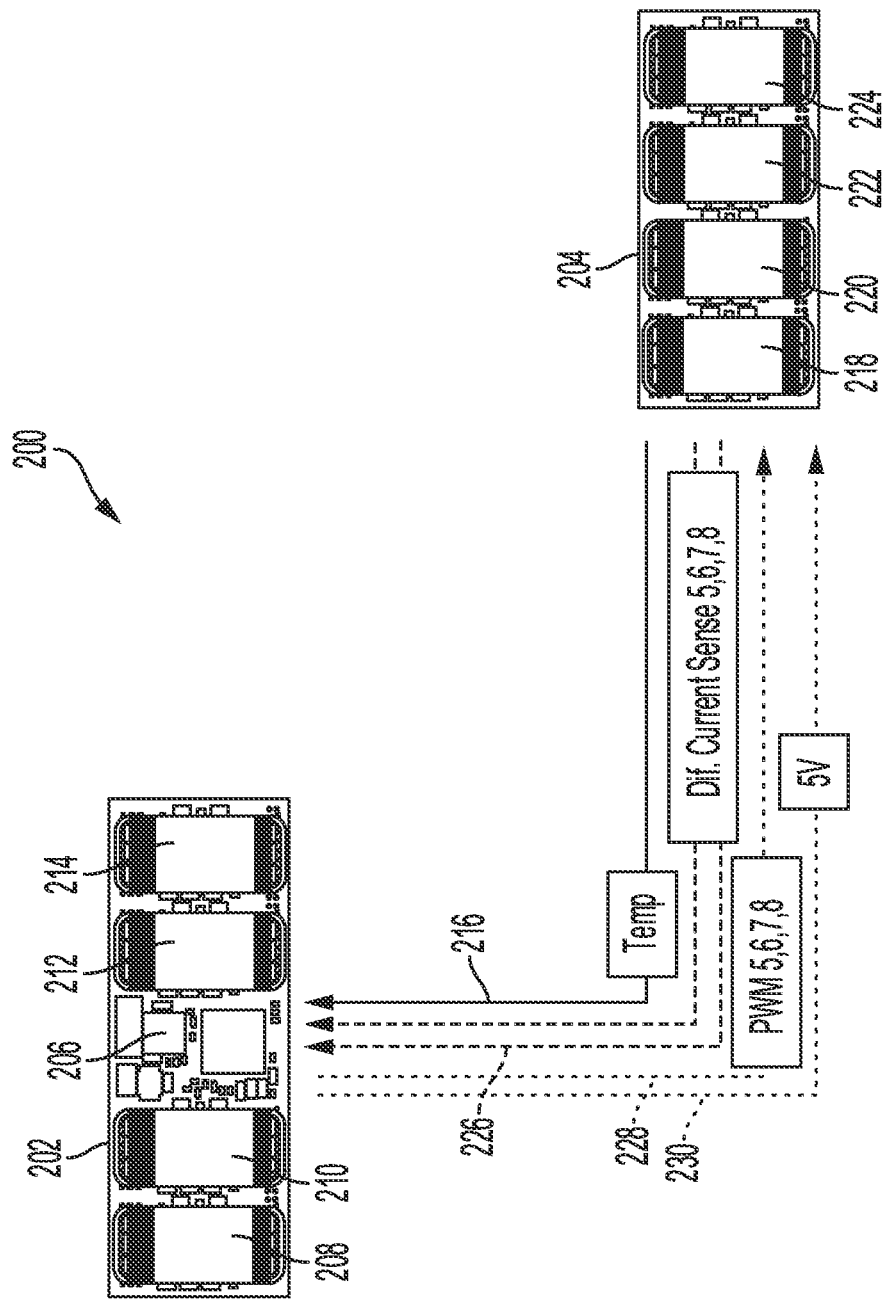
FIG. 2 is a simplified block diagram depicting the exemplary power delivery stage, in accordance with one or more examples of the present application.

FIG. 2 is a simplified block diagram depicting the exemplary power delivery system, in accordance with one or more examples of the present application. FIG. 2 depicts a master module 202 that is similar to master module 102 described in FIG. 1. Master module 202 includes controller 206 (similar to controller 108 described in FIG. 1). Master module 202 also includes smart power stages 208, 210, 212, and 214. In some embodiments, the master module 202 may include fewer than four smart power stages as per the power need of the load to which the master module 202 is connected. Master module 202 also includes sensors 112 (depicted in FIG. 1, but not depicted in FIG. 2) that exchanges signals with smart power stages 208, 210, 212, and 214.

FIG. 2 also includes a satellite module 204 that is similar to satellite module 106 described in FIG. 1. Satellite module 204 includes a plurality of smart power stages. In some cases, satellite module 204 may include up to a maximum of four smart power stages 218, 220, 222, and 224. In some embodiments, the number of smart power stages installed on the satellite module may depend on the power requirements of the load connected to the satellite module.

In some examples, sensors 112 of master module 202 also exchange signals with smart power stages 218, 220, 222, and 224 of satellite module 204. In such embodiments, sensors 112 of master module 202 may provide power signals PWM to each of the different smart power stages 208, 210, 212, and 214 of master module 202 and smart power stages 218, 220, 222, and 224 of satellite module 204. The PWM signals may be used to power up the smart power stages 208, 210, 212, and 214 of master module 202 and smart power stages 218, 220, 222, and 224 of the satellite module 204. In some embodiments, based on the power needs of the load connected to the master module 202, the controller 206 of the master module 202 may only power on a subset of the smart power stages 208, 210, 212, and 214 of master module 202 and smart power stages 218, 220, 222, and 224 of satellite power module 204. In some cases, based on the power needs of the load connected to the satellite module 204, the controller 206 of the master module 202 may only power on a subset of the smart power stages 218, 220, 222, and 224 of satellite module 204. In some embodiments, when the master module 202 and the satellite module 204 are configured to provide power to the same load, the controller 206 of the master module 202 may only power a subset of the power stages 208, 210, 212, and 214 of master module 202 and 218, 220, 222, and 224 of the satellite module 204 based on the requirement of the load.

In some examples, the controller 206 of the master module 202 provides a 5V bias to the smart power stages 208, 210, 212, and 214 of master module 202, and smart power stages 218, 220, 222, and 224 of the satellite module 204. In such embodiments, the master module 202 is able to provide a 5V bias to the master module 202 and satellite module 204 from the master power supply of the master module 202. In such embodiments, the master power supply of the master module 202 is derived from the power supply of the main circuit board. In such examples, the input voltage received from the power supply of the main circuit board is divided into a variety of voltage levels to meet the different needs of the controller 206, master module 202 and satellite module 204. The master power supply of the master module is divided into a 3.3V signal, that powers the controller 206 of the master module 202 and a second 5V signal that provides the bias voltage for each of the smart power stages 208, 210, 212, and 214 on the master module 202 and smart power stages 218, 220, 222, and 224 of the satellite module 204.

In some cases, the PWM signals and the 5V bias signals are communicated with satellite module 204 using wired connections 228 and 230 respectively.

In some embodiments, the sensors 112 of the master module 202 also receive signals from smart power stages 208, 210, 212, and 214 of the master module, and 218, 220, 222, and 224 of satellite power stage 204. In such embodiments, some of the signals that the controller 205 of the master module 202 may receive include temperature sensors and differential current sensors. In such embodiments, the temperature signals from each of the smart power stages 218, 220, 222, and 224 of the satellite power stage 204 may be received via the signal line 216. In some embodiments, the temperature signals may include one signal line for each smart power stage. In some examples, differential current signals from each of the smart power stages 218, 220, 222, and 224 of the satellite power system 204 may be received via the signal line 226. Differential current measures the change in current values rather than the actual current. For example, a differential current reading can inform the controller 108 about a change in current from any one of the smart power stages 218, 220, 222, and 224 on the satellite module 204. In some cases, the differential current signals may be communicated using two signal lines for each smart power stage.

In some embodiments, smart powers stage on master module 202 and smart power stages on satellite module 204 use I2C/PMUBS/SMBus protocols to communicate with controller 206 of the master module 202 and the rest of the main circuit board. In some embodiments, the signals communicated between the smart power stages and controller 206 include temperature, voltage, input and output currents and input and output power consumption.

Figure 3:
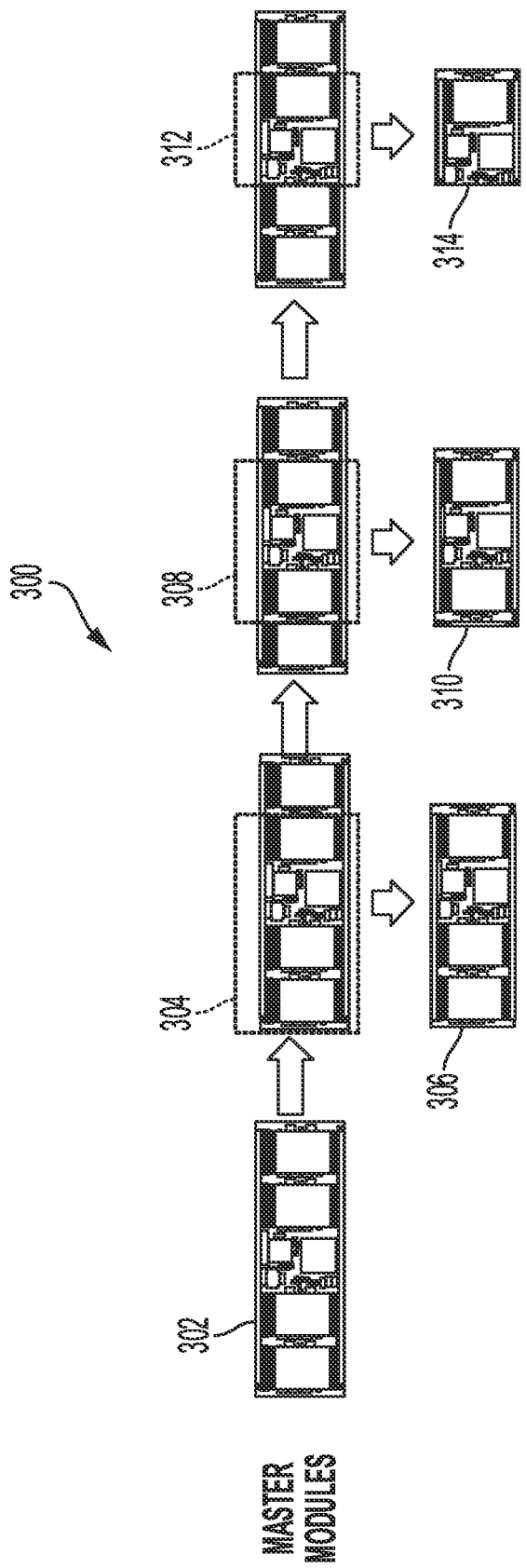
Figure 4:
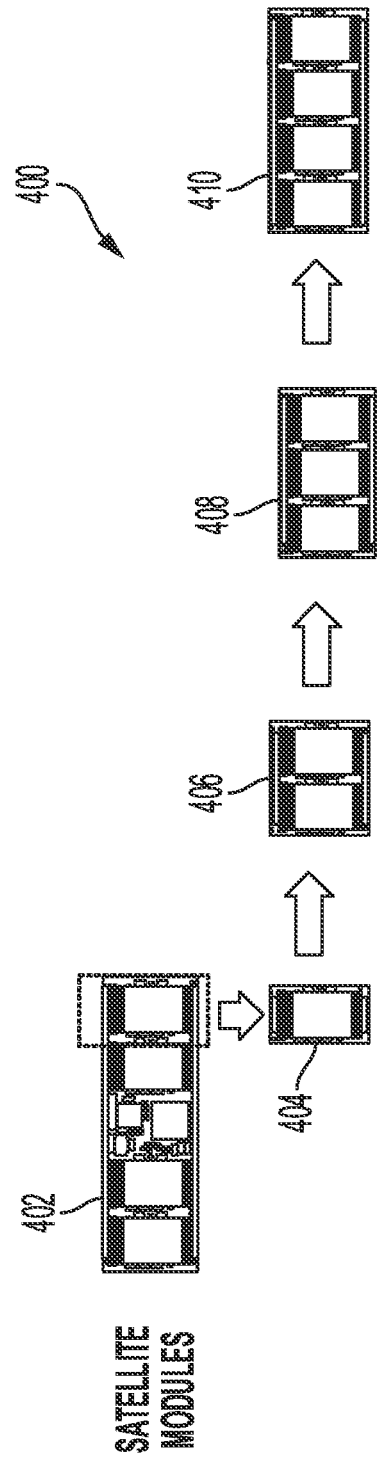

FIGS. 3-4 and 5A-5D are simplified block diagrams depicting various configurations of the exemplary power delivery system, in accordance with one or more examples of the present application. The architecture of the power delivery system shown in FIG. 1 is based on dual loop controller. The smart power stages can be assigned as need to either a single voltage output or a dual voltage output. FIG. 3 depicts a the modular nature of the master module (e.g., master module 102 of FIG. 1) of the power delivery system 100. FIG. 4 depicts the modular nature of the satellite module (e.g., satellite module 106 of FIG. 1) of the power delivery system 100. FIGS. 5A-5D depicts different configurations of the master module and the satellite module in connection with various outputs.

In FIG. 3, master module 302 is similar to master module 202 described in FIG. 2. Similar to master module 202 in FIG. 2, master module 302 in FIG. 3 includes a controller and four smart power stages. If we assume that each smart power stage of master module 302 has a maximum current rating of 40 A, a combination of four smart power stages provides a maximum current of 160 A. If the current requirement a load connected to the master module 302 is 120 A or less, the master module 302 may be modified by selecting a subset of three smart power stages 304 from the four smart power stages 302 to generate a new master module 306 that provides a maximum current of 120 A. The master module 306 may be further modified by selecting a subset of any two smart power stages in conjunction with the controller as depicted in 308 to generate a new master module 310 that provides a maximum current of 80 A. Finally, in order to cater to a component that requires a maximum current of 40 A or less, the master module 310 may be modified by selecting only one smart power stage in conjunction with the controller in 312 to generate the master module 314.

FIG. 4 depicts the modular nature of the satellite module, that is derived from the master module 402. Master module 402 described in FIG. 4 is similar to master module 302 of FIG. 3 and master module 202 of FIG. 2. Master module 402 includes a controller and smart power stages. As described in FIG. 2, master module 202 includes a controller 206 that controls the smart power stages of the master module 202 and the satellite module 204. As described with respect to FIG. 1, a satellite module may be used in two different configurations. In some examples, a satellite module may be used to supplement the maximum current capacity of the master module. In such embodiments, the master module and the satellite module are connected to the same load. In some embodiments, the satellite module and the master module may be used to provide power to two different loads. In some embodiments, the satellite module may include a single smart power stage as shown in satellite module 404. In some cases, the satellite module may include two smart power stages as shown in satellite module 406. In some examples, the satellite module may include three smart power stages as shown in satellite module 408. In some embodiments, the satellite module may include four smart power stages as shown in satellite module 410. As described with respect to FIG. 1, the number of smart power stages to be installed in the satellite module depend on the power required by the power delivery system. The smart power stages installed on the satellite module are controlled by controller 108 (shown in FIG. 1). The smart power stages of the satellite module communicate with controller 108 of master module by exchanging signals. This is shown in more detail in FIG. 2.

Power delivery system 100 (shown in FIG. 1) is highly versatile and may be configured based on the needs of the main circuit board. In different embodiments, the number of smart power stages that are configured to work in conjunction with the master module 102 (shown in FIG. 1) may be modified based on the need of the main circuit board component. In each embodiment, the master module 102 may also be configured to work with different smart power stages installed on the satellite module 106 (shown in FIG. 1). Furthermore, the master module 102 and satellite module 106 may be configured to provide power to a single output or two different outputs.

A list of configurations of the master module and the satellite module are depicted in Tables 1-4 below. For the purposes of description, we assume that the maximum current that provided by a smart power stage is 40 A.

Table 1 depicts the configurations of the power delivery system 100 (shown in FIG. 1) with only one smart power stage working in conjunction with the master module 102 (shown in FIG. 1). Table 1 depicts 9 different configurations of operation. Programs 0-8 in Table 1 depict the operational configurations of power delivery system 100 with a single smart power stage 110a that works in conjunction with the controller on the master module 102 and different smart power stages 106a, 106b, 106c, and 106d (shown in FIG. 1) in the satellite module 106 (shown in FIG. 1). These 9 configurations of operations are divided in 2 categories. Programs 1-4 depict operational configurations of the power delivery system 100 where both the master module 102 and the satellite module 106 are configured to provide power to the same output, Output 1. Programs 5-8 depict operational configurations of the power delivery system 100 where both the master module 102 and the satellite module 106 are configured to provide power to two different outputs, Output 1 and Output 2.

Program 0 depicts an operational configuration of the power delivery system 100 with a single smart power stage 110a that works in conjunction with the controller. In such a configuration, the power delivery system 100 may provide a maximum of 40 A of current to the one output, Output 1. Program 1 depicts operational configuration of the power delivery system 100 with a single smart power stage 110a that works in conjunction with the controller on the master module 102 and a single smart power stage 106a on the satellite module 106. Both the master module 102 and the satellite module 106 are configured to provide power to the same output, Output 1. In such a program, the maximum current that the power delivery system 100 may provide to Output 1 is 80 A.

Program 2 depicts another operational configuration of the power delivery system 100 with a single smart power stage 110a that works in conjunction with the controller on the master module 102 and two smart power stages 106a and 106b on the satellite module 106. Both the master module 102 and the satellite module 106 are configured to provide power to the same output, Output 1. In such a program, the maximum current that the power delivery system 100 may provide to Output 1 is 120 A.

Program 3 depicts another operational configuration of the power delivery system 100 with a single smart power stage 110a that works in conjunction with the controller on the master module 102 and three smart power stages 106a, 106b, and 106c on the satellite module 106. Both the master module 102 and the satellite module 106 are configured to provide power to the same output, Output 1. In such a

TABLE 1

| | 40A Master Family | | Output 1 | | Output 2 | | |
|---|---|---|---|---|---|---|---|
| | | | Smart Power | | Smart Power | | Total |
| Program | Master | Satellite | Stage(s) | Current | Stage(s) | Current | A |
| 0 | 40A Master | | 1 | 40 | 0 | 0 | 40 |
| 1 | 40A Master | Sat 40A | 2 | 80 | 0 | 0 | 80 |
| 2 | 40A Master | Sat 80A | 3 | 120 | 0 | 0 | 120 |
| 3 | 40A Master | Sat 120A | 4 | 160 | 0 | 0 | 160 |
| 4 | 40A Master | Sat 160A | 5 | 200 | 0 | 0 | 200 |
| 5 | 40A Master | Sat 40A | 1 | 40 | 1 | 40 | 80 |
| 6 | 40A Master | Sat 80A | 1 | 40 | 2 | 80 | 120 |
| 7 | 40A Master | Sat 120A | 1 | 40 | 3 | 120 | 160 |
| 8 | 40A Master | Sat 160A | 1 | 40 | 4 | 160 | 200 | program, the maximum current that the power delivery system 100 may provide to Output 1 is 160 A.

Program 4 depicts another operational configuration of the power delivery system 100 with a single smart power stage 110*a* that work in conjunction with the controller on the master module 102 and four smart power stages 106*a*, 106*b*, 106*c*, and 106*d* on the satellite module 106. Both the master module 102 and the satellite module 106 are configured to provide power to the same output, Output 1. In such a program, the maximum current that the power delivery system 100 may provide to Output 1 is 200 A.

Program 5 depicts another operational configuration of the power delivery system 100 with a single smart power stage 110*a* that works in conjunction with the controller on the master module 102 and a single smart power stage 106*a* on the satellite module 106. The master module 102 is configured to provide power to Output 1, while the satellite module 106 is configured to provide power to Output 2. In such a program, the maximum current that the power delivery system 100 may provide to Output 1 is 40 A, and the maximum current that the power delivery system may provide to Output 2 is 40 A.

Program 6 depicts another operational configuration of the power delivery system 100 with a single smart power stage 110*a* that works in conjunction with the controller on the master module 102 and a two smart power stages 106*a* and 106*b* on the satellite module 106. The master module 102 is configured to provide power to Output 1, while the satellite module 106 is configured to provide power to Output 2. In such a program, the maximum current that the power delivery system 100 may provide to Output 1 is 40 A, and the maximum current that the power delivery system may provide to Output 2 is 80 A.

Program 7 depicts another operational configuration of the power delivery system 100 with a single smart power stage 110*a* that works in conjunction with the controller on the master module 102 and three smart power stages 106*a*, 106*b*, and 106*c* on the satellite module 106. The master module 102 is configured to provide power to Output 1, while the satellite module 106 is configured to provide power to Output 2. In such a program, the maximum current that the power delivery system 100 may provide to Output 1 is 40 A, and the maximum current that the power delivery system may provide to Output 2 is 120 A.

Program 8 depicts another operational configuration of the power delivery system 100 with a single smart power stage 110*a* that works in conjunction with the controller on the master module 102 and four smart power stages 106*a*, 106*b*, 106*c*, and 106*d* on the satellite module 106. The master module 102 is configured to provide power to Output 1, while the satellite module 106 is configured to provide power to Output 2. In such a program, the maximum current that the power delivery system 100 may provide to Output 1 is 40 A, and the maximum current that the power delivery system may provide to Output 2 is 160 A.

TABLE 2

| | 80A Master Family | | Output 1 | | Output 2 | | |
| | | | Smart Power | | Smart Power | | Total |
| Program | Master | Satellite | Stage(s) | Current | Stage(s) | Current | A |
| --- | --- | --- | --- | --- | --- | --- | --- |
| 0 | 80A Master | | 2 | 80 | 0 | 0 | 80 |
| 1 | 80A Master | Sat 40A | 3 | 120 | 0 | 0 | 120 |
| 2 | 80A Master | Sat 80A | 4 | 160 | 0 | 0 | 160 |
| 3 | 80A Master | Sat 120A | 5 | 200 | 0 | 0 | 200 |
| 4 | 80A Master | Sat 160A | 6 | 240 | 0 | 0 | 240 |
| 5 | 80A Master | Sat 40A | 2 | 80 | 1 | 40 | 120 |
| 6 | 80A Master | Sat 80A | 2 | 80 | 2 | 80 | 160 |
| 7 | 80A Master | Sat 120A | 2 | 80 | 3 | 120 | 200 |
| 8 | 80A Master | Sat 160A | 2 | 80 | 4 | 160 | 240 |

Table 2 depicts the configurations of the power delivery system 100 (shown in FIG. 1) with two smart power stages working in conjunction with the master module 102 (shown in FIG. 1). Table 1 depicts 9 different configurations of operation. Programs 0-8 in Table 1 depict the operational configurations of power delivery system 100 with two smart power stages 110*a* and 110*b* that work in conjunction with the controller on the master module 102 and different smart power stages 106*a*, 106*b*, 106*c*, and 106*d* (shown in FIG. 1) in the satellite module 106 (shown in FIG. 1). These 9 configurations of operations are divided in 2 categories. Programs 1-4 depict operational configurations of the power delivery system 100 where both the master module 102 and the satellite module 106 are configured to provide power to the same output, Output 1. Programs 5-8 depict operational configurations of the power delivery system 100 where both the master module 102 and the satellite module 106 are configured to provide power to two different outputs, Output 1 and Output 2.

Program 0 depicts an operational configuration of the power delivery system 100 with two smart power stages 110*a* and 110*b* that work in conjunction with the controller. In such a configuration, the power delivery system 100 may provide a maximum of 80 A of current to the one output, Output 1. Program 1 depicts another operational configuration of the power delivery system 100 with two smart power stages 110*a* and 110*b* that works in conjunction with the controller on the master module 102 and a single smart power stage 106*a* on the satellite module 106. Both the master module 102 and the satellite module 106 are configured to provide power to the same output, Output 1. In such a program, the maximum current that the power delivery system 100 may provide to Output 1 is 120 A.

Program 2 depicts another operational configuration of the power delivery system 100 with two smart power stages 110*a* and 110*b* that work in conjunction with the controller on the master module 102 and two smart power stages 106*a* and 106*b* on the satellite module 106. Both the master module 102 and the satellite module 106 are configured to provide power to the same output, Output 1. In such a program, the maximum current that the power delivery system 100 may provide to Output 1 is 160 A.

Program 3 depicts another operational configuration of the power delivery system 100 with two smart power stages 110a and 110b that work in conjunction with the controller on the master module 102 and three smart power stages 106a, 106b, and 106c on the satellite module 106. Both the master module 102 and the satellite module 106 are configured to provide power to the same output, Output 1. In such a program, the maximum current that the power delivery system 100 may provide to Output 1 is 200 A.

Program 4 depicts another operational configuration of the power delivery system 100 with two smart power stages 110a and 110b that work in conjunction with the controller on the master module 102 and four smart power stages 106a, 106b, 106c, and 106d on the satellite module 106. Both the master module 102 and the satellite module 106 are configured to provide power to the same output, Output 1. In such a program, the maximum current that the power delivery system 100 may provide to Output 1 is 240 A.

Programs 5-8 depict operational configurations of the power delivery system 100 where both the master module 102 and the satellite module 106 are configured to provide power to two different outputs, Output 1 and Output 2.

Program 5 depicts another operational configuration of the power delivery system 100 with two smart power stages 110a and 110b that work in conjunction with the controller on the master module 102 and a single smart power stage 106a on the satellite module 106. The master module 102 is configured to provide power to Output 1, while the satellite module 106 is configured to provide power to Output 2. In such a program, the maximum current that the power delivery system 100 may provide to Output 1 is 80 A, and the maximum current that the power delivery system may provide to Output 2 is 40 A.

Program 6 depicts another operational configuration of the power delivery system 100 with two smart power stages 110a and 110b that work in conjunction with the controller on the master module 102 and a two smart power stages 106a and 106b on the satellite module 106. The master module 102 is configured to provide power to Output 1, while the satellite module 106 is configured to provide power to Output 2. In such a program, the maximum current that the power delivery system 100 may provide to Output 1 is 80 A, and the maximum current that the power delivery system may provide to Output 2 is 80 A.

Program 7 depicts another operational configuration of the power delivery system 100 with two smart power stages 110a and 110b that work in conjunction with the controller on the master module 102 and three smart power stages 106a, 106b, and 106c on the satellite module 106. The master module 102 is configured to provide power to Output 1, while the satellite module 106 is configured to provide power to Output 2. In such a program, the maximum current that the power delivery system 100 may provide to Output 1 is 80 A, and the maximum current that the power delivery system may provide to Output 2 is 120 A.

Program 8 depicts another operational configuration of the power delivery system 100 with two smart power stages 110a and 110b that work in conjunction with the controller on the master module 102 and four smart power stages 106a, 106b, 106c, and 106d on the satellite module 106. The master module 102 is configured to provide power to Output 1, while the satellite module 106 is configured to provide power to Output 2. In such a program, the maximum current that the power delivery system 100 may provide to Output 1 is 80 A, and the maximum current that the power delivery system may provide to Output 2 is 160 A.

TABLE 3

| | 120A Master Family | | Output 1 | | Output 2 | | |
| --- | --- | --- | --- | --- | --- | --- | --- |
| | | | Smart Power | | Smart Power | | Total |
| Program | Master | Satellite | Stage(s) | Current | Stage(s) | Current | A |
| 0 | 120A Master | | 3 | 120 | 0 | 0 | 120 |
| 1 | 120A Master | Sat 40A | 4 | 160 | 0 | 0 | 160 |
| 2 | 120A Master | Sat 80A | 5 | 200 | 0 | 0 | 200 |
| 3 | 120A Master | Sat 120A | 6 | 240 | 0 | 0 | 240 |
| 4 | 120A Master | Sat 160A | 7 | 280 | 0 | 0 | 280 |
| 5 | 120A Master | Sat 40A | 3 | 120 | 1 | 40 | 160 |
| 6 | 120A Master | Sat 80A | 3 | 120 | 2 | 80 | 200 |
| 7 | 120A Master | Sat 120A | 3 | 120 | 3 | 120 | 240 |
| 8 | 120A Master | Sat 160A | 3 | 120 | 4 | 160 | 280 |

Table 3 depicts configurations of the power delivery system 100 (shown in FIG. 1) with three smart power stages working in conjunction with the master module 102 (shown in FIG. 1). Table 1 depicts 9 different configurations of operation. Programs 0-8 in Table 1 depict the operational configurations of power delivery system 100 with three smart power stages 110a, 110b, and 110c that work in conjunction with the controller on the master module 102 and different smart power stages 106a, 106b, 106c, and 106d (shown in FIG. 1) in the satellite module 106 (shown in FIG. 1). These 9 configurations of operations are divided in 2 categories. Programs 1-4 depict operational configurations of the power delivery system 100 where both the master module 102 and the satellite module 106 are configured to provide power to the same output, Output 1. Programs 5-8 depict operational configurations of the power delivery system 100 where both the master module 102 and the satellite module 106 are configured to provide power to two different outputs, Output 1 and Output 2.

Program 0 depicts an operational configuration of the power delivery system 100 with three smart power stages 110a, 110b, and 110c that work in conjunction with the controller. In such a configuration, the power delivery system 100 may provide a maximum of 120 A of current to the one output, Output 1. Program 1 depicts another operational configuration of the power delivery system 100 with three smart power stages 110a, 110b, and 110c that work in conjunction with the controller on the master module 102 and a single smart power stage 106a on the satellite module 106. Both the master module 102 and the satellite module 106 are configured to provide power to the same output, Output 1. In such a program, the maximum current that the power delivery system 100 may provide to Output 1 is 160 A.

Program 2 depicts another operational configuration of the power delivery system 100 with three smart power stages 110a, 110b, and 110c that work in conjunction with the controller on the master module 102 and two smart power stages 106a and 106b on the satellite module 106. Both the master module 102 and the satellite module 106 are configured to provide power to the same output, Output 1. In such a program, the maximum current that the power delivery system 100 may provide to Output 1 is 200 A.

Program 3 depicts another operational configuration of the power delivery system 100 with three smart power stages 110a, 110b, and 110c that work in conjunction with the controller on the master module 102 and three smart power stages 106a, 106b, and 106c on the satellite module 106. Both the master module 102 and the satellite module 106 are configured to provide power to the same output, Output 1. In such a program, the maximum current that the power delivery system 100 may provide to Output 1 is 240 A.

Program 4 depicts another operational configuration of the power delivery system 100 with three smart power stages 110a, 110b, and 110c that work in conjunction with the controller on the master module 102 and four smart power stages 106a, 106b, 106c, and 106d on the satellite module 106. Both the master module 102 and the satellite module 106 are configured to provide power to the same output, Output 1. In such a program, the maximum current that the power delivery system 100 may provide to Output 1 is 280 A.

Programs 5-8 depict operational configurations of the power delivery system 100 where both the master module 102 and the satellite module 106 are configured to provide power to two different outputs, Output 1 and Output 2.

Program 5 depicts another operational configuration of the power delivery system 100 with three smart power stages 110a, 110b, and 110c, that work in conjunction with the controller on the master module 102 and a single smart power stage 106a on the satellite module 106. The master module 102 is configured to provide power to Output 1, while the satellite module 106 is configured to provide power to Output 2. In such a program, the maximum current that the power delivery system 100 may provide to Output 1 is 120 A, and the maximum current that the power delivery system may provide to Output 2 is 40 A.

Program 6 depicts another operational configuration of the power delivery system 100 with three smart power stages 110a, 110b, and 110c that work in conjunction with the controller on the master module 102 and a two smart power stages 106a and 106b on the satellite module 106. The master module 102 is configured to provide power to Output 1, while the satellite module 106 is configured to provide power to Output 2. In such a program, the maximum current that the power delivery system 100 may provide to Output 1 is 120 A, and the maximum current that the power delivery system may provide to Output 2 is 80 A.

Program 7 depicts another operational configuration of the power delivery system 100 with three smart power stages 110a, 110b, and 110c that work in conjunction with the controller on the master module 102 and three smart power stages 106a, 106b, and 106c on the satellite module 106. The master module 102 is configured to provide power to Output 1, while the satellite module 106 is configured to provide power to Output 2. In such a program, the maximum current that the power delivery system 100 may provide to Output 1 is 120 A, and the maximum current that the power delivery system may provide to Output 2 is 120 A.

Program 8 depicts another operational configuration of the power delivery system 100 with three smart power stages 110a, 110b, and 110c that work in conjunction with the controller on the master module 102 and four smart power stages 106a, 106b, and 106c on the satellite module 106. The master module 102 is configured to provide power to Output 1, while the satellite module 106 is configured to provide power to Output 2. In such a program, the maximum current that the power delivery system 100 may provide to Output 1 is 120 A, and the maximum current that the power delivery system may provide to Output 2 is 160 A.

TABLE 4

| | 160A Master Family | | Output 1 | | Output 2 | | Total |
|---|---|---|---|---|---|---|---|
| Program | Master | Satellite | Smart Power Stage(s) | Current | Smart Power Stage(s) | Current | A |
| 0 | 160A Master | | 4 | 160 | 0 | 0 | 160 |
| 1 | 160A Master | Sat 40A | 5 | 200 | 0 | 0 | 200 |
| 2 | 160A Master | Sat 80A | 6 | 240 | 0 | 0 | 240 |
| 3 | 160A Master | Sat 120A | 7 | 280 | 0 | 0 | 280 |
| 4 | 160A Master | Sat 160A | 8 | 320 | 0 | 0 | 320 |
| 5 | 160A Master | Sat 40A | 4 | 160 | 1 | 40 | 200 |
| 6 | 160A Master | Sat 80A | 4 | 160 | 2 | 80 | 240 |
| 7 | 160A Master | Sat 120A | 4 | 160 | 3 | 120 | 280 |
| 8 | 160A Master | Sat 160A | 4 | 160 | 4 | 160 | 320 |

Table 4 depicts the configurations of the power delivery system 100 (shown in FIG. 1) with four smart power stages working in conjunction with the master module 102 (shown in FIG. 1). Table 1 depicts 9 different configurations of operation. Programs 0-8 in Table 1 depict the operational configurations of power delivery system 100 with four smart power stages 110a, 110b, 110c, and 110d that work in conjunction with the controller on the master module 102 and different smart power stages 106a, 106b, 106c, and 106d (shown in FIG. 1) in the satellite module 106 (shown in FIG. 1). These 9 configurations of operations are divided in 2 categories. Programs 1-4 depict operational configurations of the power delivery system 100 where both the master module 102 and the satellite module 106 are configured to provide power to the same output, Output 1. Programs 5-8 depict operational configurations of the power delivery system 100 where both the master module 102 and the satellite module 106 are configured to provide power to two different outputs, Output 1 and Output 2.

Program 0 depicts an operational configuration of the power delivery system 100 with four smart power stages 110a, 110b, 110c, and 110d that work in conjunction with the controller. In such a configuration, the power delivery system 100 may provide a maximum of 120 A of current to the one output, Output 1. Program 1 depicts another operational configuration of the power delivery system 100 with four smart power stages 110a, 110b, 110c, and 110d that work in conjunction with the controller on the master module 102 and a single smart power stage 106a on the satellite module 106. In such a program, the maximum current that the power delivery system 100 may provide to Output 1 is 200 A.

Program 2 depicts another operational configuration of the power delivery system 100 with four smart power stages 110a, 110b, 110c, and 110d that work in conjunction with the controller on the master module 102 and a two smart power stages 106a and 106b on the satellite module 106. In such a program, the maximum current that the power delivery system 100 may provide to Output 1 is 240 A.

Program 3 depicts another operational configuration of the power delivery system 100 with four smart power stages 110a, 110b, 110c, and 110d that work in conjunction with the controller on the master module 102 and three smart power stages 106a, 106b, and 106c on the satellite module 106. Both the master module 102 and the satellite module 106 are configured to provide power to the same output, Output 1. In such a program, the maximum current that the power delivery system 100 may provide to Output 1 is 280 A.

Program 4 depicts another operational configuration of the power delivery system 100 with four smart power stages 110a, 110b, 110c, and 110d that work in conjunction with the controller on the master module 102 and four smart power stages 106a, 106b, 106c, and 106d on the satellite module 106. Both the master module 102 and the satellite module 106 are configured to provide power to the same output, Output 1. In such a program, the maximum current that the power delivery system 100 may provide to Output 1 is 320 A.

Programs 5-8 depict operational configurations of the power delivery system 100 where both the master module 102 and the satellite module 106 are configured to provide power to two different outputs, Output 1 and Output 2.

Program 5 depicts another operational configuration of the power delivery system 100 with four smart power stages 110a, 110b, 110c, and 110d that work in conjunction with the controller on the master module 102 and a single smart power stage 106a on the satellite module 106. The master module 102 is configured to provide power to Output 1, while the satellite module 106 is configured to provide power to Output 2. In such a program, the maximum current that the power delivery system 100 may provide to Output 1 is 160 A, and the maximum current that the power delivery system may provide to Output 2 is 40 A.

Program 6 depicts another operational configuration of the power delivery system 100 with four smart power stages 110a, 110b, 110c, and 110d that work in conjunction with the controller on the master module 102 and a two smart power stages 106a and 106b on the satellite module 106. The master module 102 is configured to provide power to Output 1, while the satellite module 106 is configured to provide power to Output 2. In such a program, the maximum current that the power delivery system 100 may provide to Output 1 is 160 A, and the maximum current that the power delivery system may provide to Output 2 is 80 A.

Program 7 depicts another operational configuration of the power delivery system 100 with four smart power stages 110a, 110b, 110c, and 110d that work in conjunction with the controller on the master module 102 and three smart power stages 106a, 106b, and 106c on the satellite module 106. The master module 102 is configured to provide power to Output 1, while the satellite module 106 is configured to provide power to Output 2. In such a program, the maximum current that the power delivery system 100 may provide to Output 1 is 160 A, and the maximum current that the power delivery system may provide to Output 2 is 120 A.

Program 8 depicts another operational configuration of the power delivery system 100 with four smart power stages 110a, 110b, 110c, and 110d that work in conjunction with the controller on the master module 102 and four smart power stages 106a, 106b, 106c, and 106d on the satellite module 106. The master module 102 is configured to provide power to Output 1, while the satellite module 106 is configured to provide power to Output 2. In such a program, the maximum current that the power delivery system 100 may provide to Output 1 is 160 A, and the maximum current that the power delivery system may provide to Output 2 is 160 A.

FIGS. 5A-5D depict different configurations of the master module and the satellite module in connection with various outputs. FIGS. 5A-5D depicts a non-exhaustive plurality of configurations in which the master module and satellite module may be configured to meet the power requirements of one load or two loads. FIG. 5A depicts an arrangement where the master module 502 and satellite module 504 provide power to a single load Vout. In FIG. 5A, master module 502 has four smart power stages and satellite module 504 also has four smart power stages. The configuration of FIG. 5A is similar to program 4 depicted in Table 4. From Table 4, we can deduce that configuration of FIG. 5A can provide a maximum current of 320 A to a single output, Vout1.

FIG. 5B depicts an arrangement where the master module 506 provides power to a first output Vout1 and satellite module 508 provides power to a second output Vout2. In the configuration of FIG. 5B, master module 506 has four smart power stages and satellite module 508 has one smart power stage. The configuration of FIG. 5B is similar to program 5 depicted in Table 4. From Table 4, we can deduce that configuration of FIG. 5B can provide a maximum current of 160 A to the first output, Vout1 and a maximum current of 40 A to the second output Vout2.

FIG. 5C depicts an arrangement where the master module 510 provides power to a first output Vout1 and satellite module 512 provides power to a second output Vout2. In the configuration of FIG. 5C, master module 510 has four smart power stage stages and satellite module 512 also has four smart power stages. The configuration of FIG. 5C is similar to program 8 depicted in Table 4. From Table 4, we can deduce that configuration of FIG. 5C can provide a maximum current of 160 A to the first output, Vout1 and a maximum current of 160 A to the second output Vout2.

FIG. 5D depicts an arrangement where the master module 514 and satellite module 516 provide power to a single load Vout. In the configuration of FIG. 5D, master module 514 has four smart power stages and satellite module 516 also has smart power stages. The configuration of FIG. 5D is similar to program 4 depicted in Table 4. From Table 4, we can deduce that configuration of FIG. 5D can provide a maximum current of 320 A to a single output, Vout1. FIGS. 5A and 5D, while providing the same power to the load Vout1 depict different ways to arrange the master modules 502 and 514 and satellite modules 504 and 516. When installing the master module and satellite module on the main circuit board, care must be taken to reduce the distance between the two modules on the main circuit board. The larger the distance between the two modules, the longer it takes for the signals to travel between the controller on the master module and the smart power stages on the satellite module. Furthermore, the larger the distance between the master module and the satellite module, the larger the loss in signal strength due to transience between the master module and the satellite module.

Figure 6:
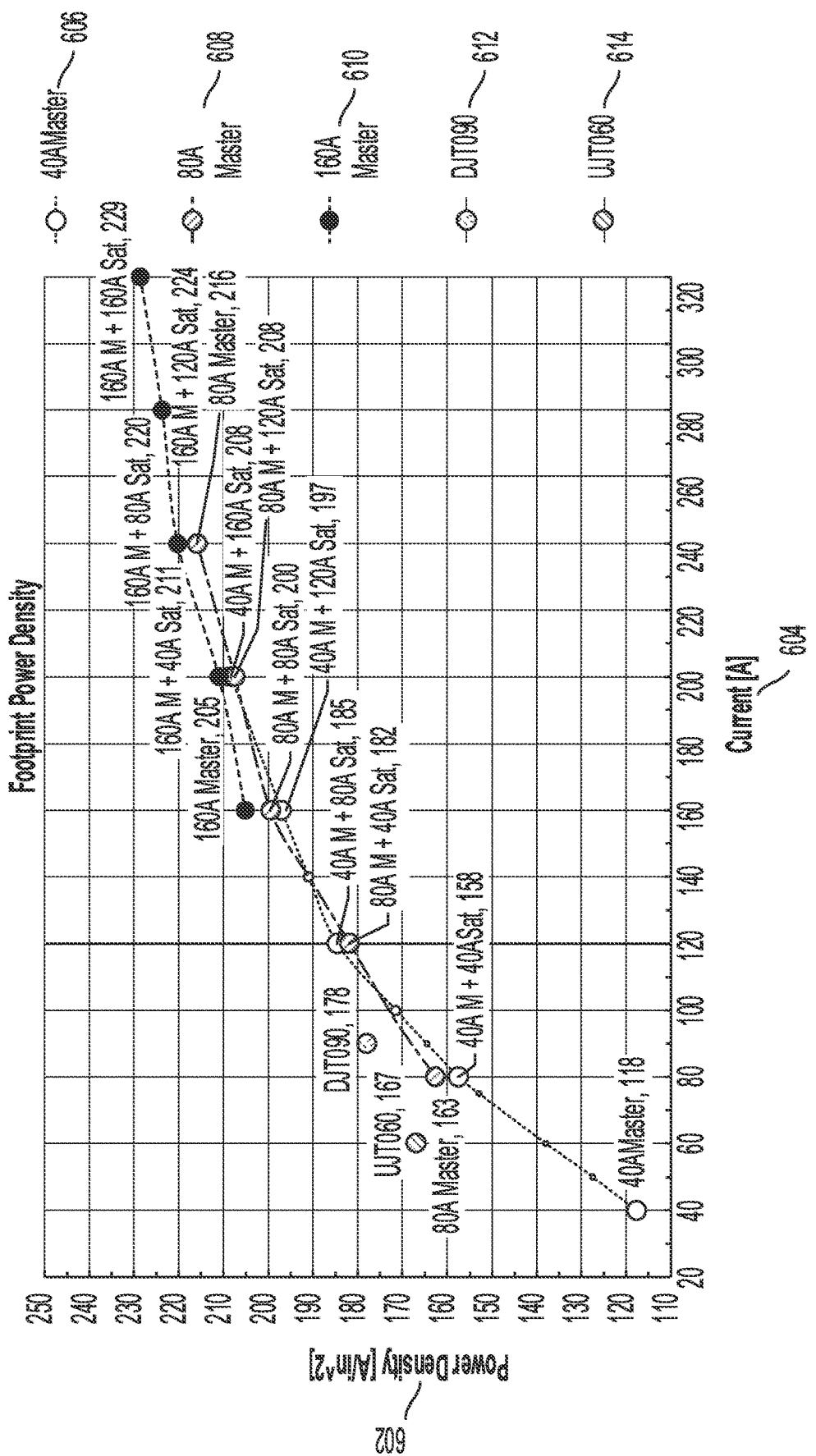
FIG. 6 is a simplified graph depicting the footprint power density of a main circuit board, in accordance with one or more examples of the present application.

FIG. 6 is a simplified graph depicting the footprint power density of a main circuit board, in accordance with one or more examples of the present application. Graph 600 shows the Power Density on the y-axis 602, measured in Amperes per unit area (A/in$^2$), measured against the current on the x-axis 604, measured in Amperes (A). Curve 606 of the graph depicts a plotting of the power density provided by a master module with a single smart power stage having a current capacity of 40 A with different configurations of the satellite module. Curve 608 of the graph depicts a plotting of the power density provided by a master module with two smart power stages having a current capacity of 80 A with different configurations of the satellite module. Curve 610 of the graph depicts a plotting of the power density provided by a master module with four smart power stages having a current capacity of 160 A with different configurations of the satellite module. Point 612 represents the power density provided by a power source DJT090 and point 614 represents the power density provided by a power source UJT060.

As is evident from any of the curves 606, 608, and 610 in FIG. 4, the capacity to provide power of the power delivery system 100 increases at a rate faster than the increase in area occupied by the power delivery system 100.

Figure 7:
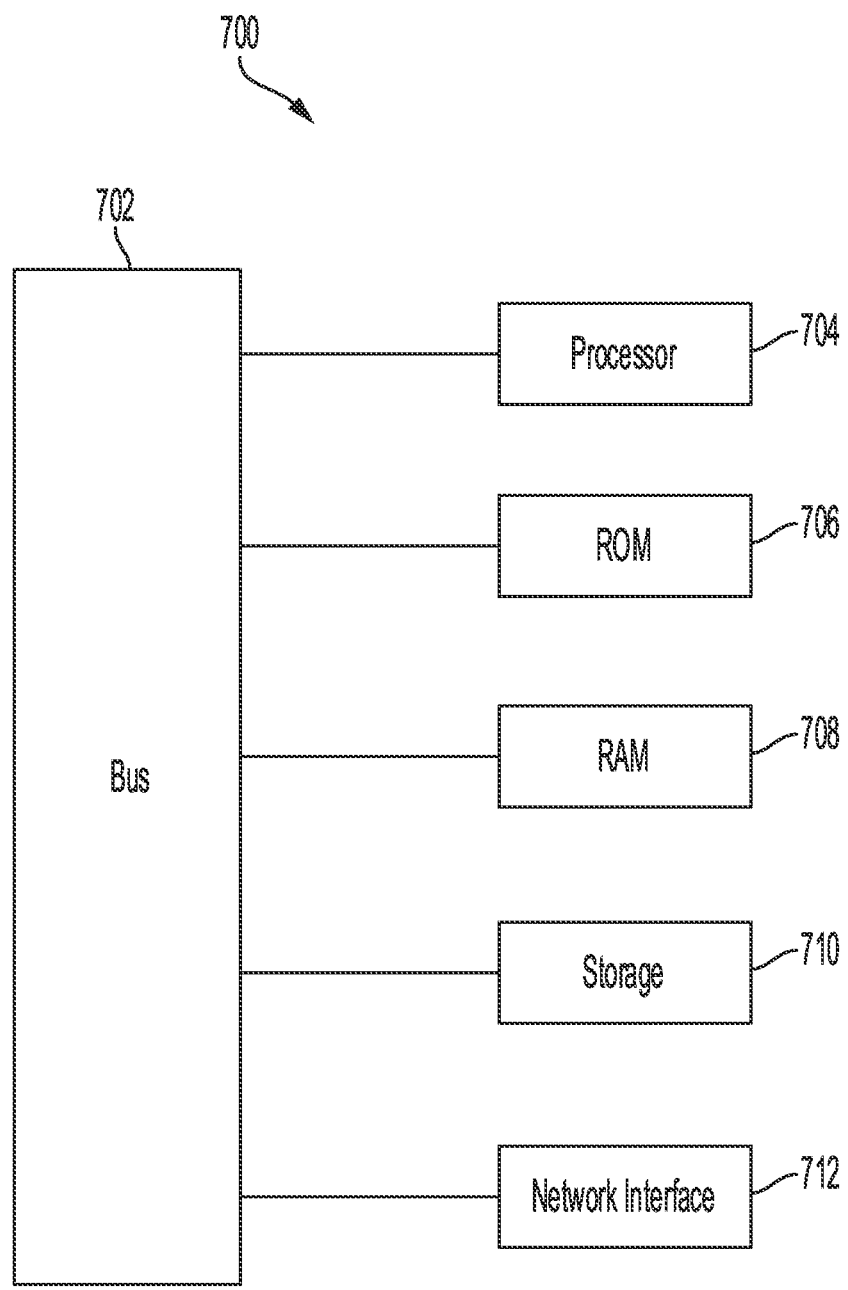
FIG. 7 is a simplified block diagram of one or more devices or stages within the exemplary environment of FIG. 1.

FIG. 7 is a block diagram of an exemplary system or device 700 within the environment 100 such as the controller 108. The system 700 includes a processor 704, such as a central processing unit (CPU), and/or logic, that executes computer executable instructions for performing the functions, processes, and/or methods described herein. In some examples, the computer executable instructions are locally stored and accessed from a non-transitory computer readable medium, such as storage 710, which may be a hard drive or flash drive. Read Only Memory (ROM) 506 includes computer executable instructions for initializing the processor 704, while the random-access memory (RAM) 708 is the main memory for loading and processing instructions executed by the processor 704. The network interface 712 may connect to a wired network or cellular network and to a local area network or wide area network. The system 700 may also include a bus 702 that connects the processor 704, ROM 706, RAM 708, storage 710, and/or the network interface 712. The components within the system 700 may use the bus 702 to communicate with each other. The components within the system 700 are merely exemplary and might not be inclusive of every component within the controller 108. Additionally, and/or alternatively, the system 700 may further include components that might not be included within every entity of environment 100. For instance, in some examples, the controller 108 might not include a network interface 712.

Figure 8:
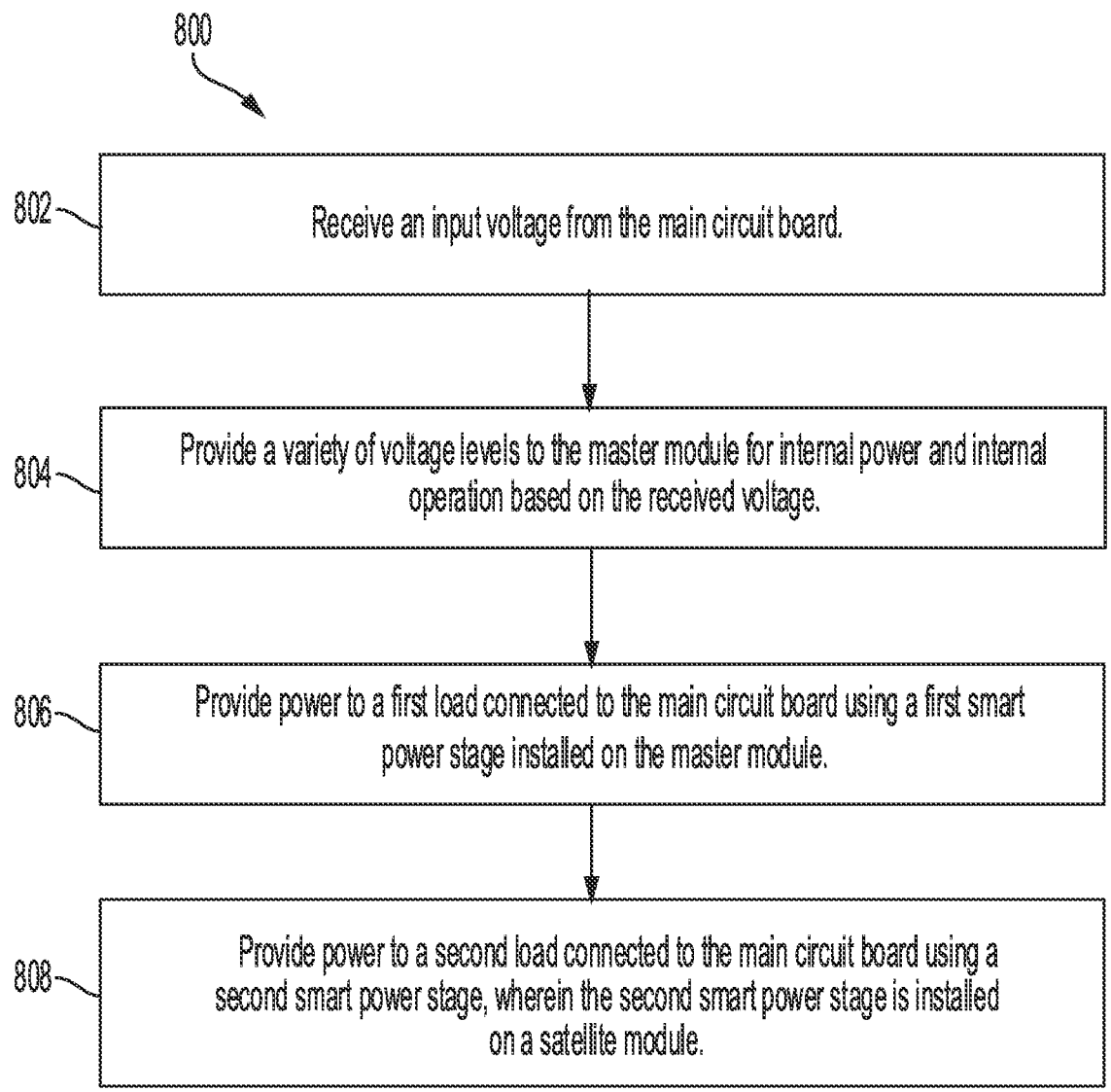
FIG. 8 is an exemplary process for using the power delivery stage, in accordance with one or more examples of the present application.

FIG. 8 is an exemplary process for using the power delivery system, in accordance with one or more examples of the present application. The process 600 may be performed by the power delivery system 100 of FIG. 1 such as the controller 108. However, it will be recognized that any of the following blocks may be performed in any suitable order and that the process 800 may be performed in any environment and by any suitable computing device and/or controller. For instance, the process 800 may also be performed by the controller 108 shown in FIG. 1.

At block 802, the controller (e.g., controller 108) receives an input voltage from the main circuit board. In some embodiments, the controller 108 of master module 102 (shown in FIG. 1) receives power from the main circuit board.

At block 804, the controller provides a variety of voltage levels to the master module for internal power and internal operation based on the received input voltage. In some embodiments, the controller divides the power received from the main circuit board into a signal of 3.3V that powers that controller, a PWM signal, and a signal of 5V.

At block 806, the controller provides power to a first load connected to the main circuit board using a first smart power stage installed on a master module. In some cases, the master module 102 may be configured to have more than one smart power stage based on the power requirement of the load to which the master module is connected. In some embodiments, the controller 108 of master module 102 provides the PWM signals and the 5V bias to the smart power stages on the master module to power the smart power stages on the master module 102.

At block 808, the controller provides power to a second load connected to the main circuit board using a second smart power stage, wherein the second smart power stage is installed on a satellite module. In some examples, the satellite module 106 (shown in FIG. 1) may be configured to have more than one smart power stage based on the power requirement of the load to which the satellite module 106 is connected. In some embodiments, the smart power stages on the satellite module 106 are also controlled by the controller 108 on the master module 102. The controller 108 provides the PWM and 5V bias signals generated in step 802 to the satellite module to power up the smart power stages on the satellite module 106. In some cases, the distance between the master module 102 and the satellite module 106 is optimized so as to minimize transience loss and time taken for the signal to travel between the controller 108 on the master module 102 and the satellite module 106.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

Indeed, the application may be exemplified in different forms and should not be construed as limited to the examples set forth herein; rather, these examples are provided so that the application will satisfy applicable legal requirements. Furthermore, when it is said herein that something is "based on" something else, it may be based on one or more other things as well. In other words, unless expressly indicated otherwise, as used herein "based on" means "based at least in part on" or "based at least partially on".

What is claimed is:

1. A multi-phase modular power delivery system, comprising:
a master module integrated with a main circuit board, wherein the master module includes a first smart power stage and a controller; and
a satellite module including a second smart power stage, wherein the controller is configured to:
receive an input voltage from the main circuit board;
provide a variety of voltage levels to the master module for internal power and internal operation based on the input voltage;
control operation of the first smart power stage of the master module to provide power to a load of the main circuit board; and
control operation of the second smart power stage of the satellite module to provide additional power to the load.

2. The multi-phase modular power delivery system of claim 1, wherein the satellite module is remote with respect to the master module.

3. The multi-phase modular power delivery system of claim 1, wherein the master module includes three additional smart power stages in addition to the first smart power stage.

4. The multi-phase modular power delivery system of claim 1, wherein the satellite module includes three additional smart power stages in addition to the second smart power stage.

5. The multi-phase modular power delivery system of claim 1, wherein the controller on the master module is further configured to provide the satellite module with bias voltage and power.

6. The multi-phase modular power delivery system of claim 1, wherein the controller on the master module is further configured to control the second smart power stage of the satellite module by exchanging a plurality of signals between the master module and the satellite module.

7. The multi-phase modular power delivery system of claim 6, wherein the plurality of signals exchanged between the master module and the satellite module comprise a temperature signal and a current signal.

8. A method operable by a multi-phase modular power delivery system including a master module integrated with a main circuit board and a satellite module, wherein the master module includes a first smart power stage and a controller, and wherein the satellite module includes a second smart power stage, the method comprising:
receiving by the controller, an input voltage from the main circuit board;
providing, by the controller, a variety of voltage levels to the master module for internal power and internal operation based on the input voltage;
controlling, by the controller, operation of the first smart power stage of the master module to provide power to the load of the main circuit board; and
controlling, by the controller, operation of the second smart power stage of the satellite module to provide additional power to the load.

9. The method of claim 8, wherein the satellite module is remote with respect to the master module.

10. The method of claim 8, wherein the master module includes three additional smart power stages in addition to the first smart power stage.

11. The method of claim 8, wherein the satellite module includes three additional smart power stages in addition to the second smart power stage.

12. The method of claim 8, wherein the method further comprises:
providing, by the controller, bias voltage and power to the satellite module.

13. The method of claim 8, wherein the method further comprises:
controlling, by the controller, the second smart power stage of the satellite module by exchanging a plurality of signals between the master module and the satellite module.

14. The method of claim 13, wherein the plurality of signals exchanged between the master module and the satellite module comprise a temperature signal and a current signal.

15. A non-transitory computer-readable medium having processor-executable instructions stored thereon, wherein the processor-executable instructions, when executed by one or more processors of a multi-phase modular power delivery system including a master module integrated with a main circuit board and a satellite module, wherein the master module includes a first smart power stage and a controller, and wherein the satellite module includes a second smart power stage, cause the one or more processors to:
receive, by the controller, an input voltage from the main circuit board;
provide, by the controller, a variety of voltage levels to the master module for internal power and internal operation based on the input voltage;
control, by the controller, operation of the first smart power stage of the master module to provide power to a load of the main circuit board; and
control, by the controller, operation of the second smart power stage of the satellite module to provide additional power to the load.

16. The non-transitory computer-readable medium of claim 15, wherein the satellite module is remote with respect to the master module.

17. The non-transitory computer-readable medium of claim 15, wherein the master module includes three additional smart power stages in addition to the first smart power stage.

18. The non-transitory computer-readable medium of claim 15, wherein the satellite module includes three additional smart power stages in addition to the second smart power stage.

19. The non-transitory computer-readable medium of claim 15, wherein the processor-executable instructions further cause the one or more processors to provide, by the controller, the satellite module with bias voltage and power.

20. The non-transitory computer-readable medium of claim 15, wherein the processor-executable instructions further cause the one or more processors to control, by the controller, the second smart power stage of the satellite module by exchanging a plurality of signals between the master module and the satellite module.

* * * * *